(12) United States Patent
Giordano

(10) Patent No.: US 7,209,289 B2
(45) Date of Patent: *Apr. 24, 2007

(54) ILLUMINATION APPARATUS WITH POLARIZING ELEMENTS FOR BEAM SHAPING

(75) Inventor: Patrick A. Giordano, Blackwood, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/237,315

(22) Filed: Sep. 27, 2005

(65) Prior Publication Data

US 2006/0023307 A1 Feb. 2, 2006

Related U.S. Application Data

(62) Division of application No. 10/746,313, filed on Dec. 24, 2003, now Pat. No. 6,975,456, which is a division of application No. 09/750,374, filed on Dec. 28, 2000, now Pat. No. 6,714,351.

(60) Provisional application No. 60/173,532, filed on Dec. 29, 1999.

(51) Int. Cl.
*G02B 5/30* (2006.01)

(52) U.S. Cl. ........................................ 359/494; 359/485
(58) Field of Classification Search ................ 359/494, 359/495, 497, 501, 485
See application file for complete search history.

(56) References Cited

U.S. PATENT DOCUMENTS

| | | | |
|---|---|---|---|
| 3,474,255 A * | 10/1969 | White | 250/225 |
| 3,892,470 A | 7/1975 | Lotspeich | |
| 4,175,830 A * | 11/1979 | Marie | 359/484 |
| 4,255,014 A * | 3/1981 | Ellis | 359/371 |
| 4,714,348 A | 12/1987 | Makosch | |
| 5,080,456 A | 1/1992 | Katz et al. | |
| 5,113,285 A * | 5/1992 | Franklin et al. | 359/465 |
| 5,150,234 A | 9/1992 | Takahashi et al. | |
| 5,479,011 A | 12/1995 | Rudeen et al. | |

(Continued)

*Primary Examiner*—Ricky D. Shafer
(74) *Attorney, Agent, or Firm*—Akin Gump Strauss Hauer & Feld, LLP

(57) ABSTRACT

Illumination apparatus for forming an output beam, the apparatus comprising: (a) a light source adapted to emit a source beam of linearly-polarized light in a downstream direction along an optical axis, said source beam having a polarization direction transverse to said optical axis; and (b) a fixed birefringent plate having first and second regions with different rotational properties such that said first region of said plate intercepts a first portion of said source beam and said second region intercepts a second portion of said source beam, said first and second regions altering the polarization of said first and second portions of said source beam by different amounts so as to form an altered beam having a central portion with a first polarization direction and a peripheral portion with a second polarization direction transverse to said first polarization direction, said peripheral portion surrounding said central portion, said central portion having a first intensity distribution relative to said optical axis, said peripheral portion having a second intensity distribution relative to said optical axis; and (c) at least one polarization-selective element mounted downstream from said birefringent plate, said at least one polarization-selective element having a transmission axis and being operative to allow transmission of light having a polarization direction parallel to such transmission axis and to prevent transmission of light having a polarization direction perpendicular to such transmission axis.

13 Claims, 4 Drawing Sheets

U.S. PATENT DOCUMENTS

| | | |
|---|---|---|
| 5,498,868 A | 3/1996 | Nishikawa et al. |
| 5,615,050 A * | 3/1997 | Kant ..................... 369/112.26 |
| 5,734,637 A | 3/1998 | Ootaki et al. |
| 5,787,061 A | 7/1998 | Tsuchiya et al. |
| 6,052,353 A | 4/2000 | Fujita |
| 6,081,377 A | 6/2000 | Tomita |
| 6,191,829 B1 | 2/2001 | Hashimoto |
| 6,714,351 B2 | 3/2004 | Giordino et al. |
| 6,791,727 B2 * | 9/2004 | Giordano et al. ............ 359/196 |
| 6,975,456 B2 * | 12/2005 | Giordano et al. ........... 359/494 |

* cited by examiner

ILLUMINATION APPARATUS WITH POLARIZING ELEMENTS FOR BEAM SHAPING

CROSS-REFERENCE TO RELATED APPLICATIONS

The present application is a divisional of U.S. patent application Ser. No. 10/746,313, filed Dec. 24, 2003, now U.S. Pat. No. 6,975,456, which is of U.S. patent application Ser. No. 09/750,374, filed Dec. 28, 2000, now U.S. Pat. No. 6,714,351, and claims the benefit of U.S. Provisional Application No. 60/173,532, filed Dec. 29, 1999, the disclosures of which are hereby incorporated herein.

BACKGROUND OF INVENTION

Bar code scanners and other optical devices use focused beams of light. For example, in one type of bar code scanner, a beam of light from a laser diode is projected along an optical axis and focused to a spot of light at a focal location in a working region along the axis. A moving mirror positioned in the path of the beam sweeps the spot along a line of motion within a working region. A photo detector detects light reflected from the working region and converts the reflected light to an electrical signal. If an object bearing a pattern of light and dark regions such as a typical bar code is placed in the working region so that the moving spot sweeps across these regions, the reflected light will vary in a pattern corresponding to the pattern of light and dark regions. The electrical signal will vary in the same manner. The electrical signal can be detected and decoded to yield the information stored in the bar code.

The size and shape of the spot of light will affect the scanning operation. Typically, the light which forms the spot has non-uniform intensity, which decreases gradually adjacent the periphery of the spot. The area in which the intensity exceeds a selected value, such as a selected proportion of the maximum intensity, is regarded as the spot. If the spot is too large in relation to the light and dark features to be detected, the light will illuminate both light and dark features simultaneously with substantial intensity, and hence it will be impossible to read the bar code properly. In many cases, a non-circular spot is desirable. Typically, the spot has a long dimension transverse to the direction of motion of the spot and a short dimension in the direction of motion. For example, this arrangement can be used in scanners which are intended to read a conventional one-dimensional bar code consisting of a pattern of light and dark strips extending parallel to one another.

In some bar code scanning applications, the distance between the scanner and the object bearing the code may vary from object to object. For these applications, it is important to provide a light beam with a substantial depth of field, i.e., a beam which has relatively small dimensions throughout a substantial range of locations around the nominal focal location. In other applications, it is more important to assure that the beam focuses to the minimum breadth at the nominal focal location, to provide the smallest beam "waist" and hence provide the smallest spot size at the nominal focal location.

Typical light source apparatus used heretofore has incorporated a laser diode, a collimating lens for focusing the light from the diode to a spot at a focal location, and an opaque plate with an aperture disposed between the lens and the focal spot for blocking light at the periphery of the beam. The characteristics of the beam depend upon the characteristics of the aperture. For example, a non-circular aperture may be used to form a non-circular beam. A large aperture yields a beam with a low "f-number" which is sharply focused to a small size at the nominal focal location but which increases in size rapidly with distance from the nominal focal location, i.e., a beam with good resolution but poor depth of field A narrow aperture yields a beam with a high f-number which has a somewhat larger spot size at the nominal focal location but which increases in size more slowly with distance from the nominal focal location. Such a beam has relatively poor resolution but good depth of field. Systems of this type are disclosed, for example, in U.S. Pat. Nos. 4,816,660 and 5,247,162.

There has been a need heretofore for further improvements in light beam sources and in scanning apparatus incorporating the same.

SUMMARY OF THE PRESENT INVENTION

One aspect of the invention provides illumination apparatus for forming an output light beam. The apparatus according to this aspect of the invention desirably includes a light source adapted to emit a source beam of polarized light in a downstream direction along an optical axis, the source beam having a polarization direction transverse to the axis. The apparatus also preferably includes one or more polarization-altering elements disposed downstream from said source. The one or more polarization-altering elements are operative to alter the polarization of the source beam nonuniformly so as to form an altered beam having a first portion with a first polarization direction and a second portion having a second polarization direction different from the first polarization direction. Preferably, the second polarization direction is perpendicular to the first polarization direction. The first portion of the altered beam has a first intensity distribution relative to the optical axis, and the second portion has a second intensity distribution relative to this axis which preferably is different from the first intensity distribution. For example, the polarization-altering element may be a birefringent element having a hole aligned with the optical axis. Light passing through the hole constitutes the first portion of the beam, and has a relatively narrow intensity distribution with maximum intensity near the axis and substantially excluding light outside of a central zone close to said axis. Light passing through the region of the birefringent element which surrounds the hole forms the second portion of the beam and has a second intensity distribution which includes substantial light outside of the central zone.

The apparatus desirably includes one or more polarization-selective elements disposed along the optical axis downstream from the one or more polarization-altering elements. Each polarization-selective element has a transmission axis and is operative to allow transmission of light having a polarization direction parallel to the transmission axis of such element and to block transmission of light having a polarization direction perpendicular to the transmission axis of such element. The one or more polarization-selective elements may include a single polarizer. If the transmission axis of the polarizer is aligned with the polarization direction of the first portion of the altered beam, an output beam passing downstream along the optical axis from the polarizer will consist essentially of the light in the first portion of the beam. In the example given above, where the intensity distribution of the first portion is narrow, the output beam will form a spot having a high effective f-number. Such a beam will resemble the beam formed by a small aperture; it will have a relatively large spot size at the nominal focus, but will have a relatively large depth of field, so that the spot size increases slowly with distance from the nominal focus.

One or more of the elements in the system, such as the light source, the polarization-altering element, and the polarization-selective element may be movable or otherwise adjustable so as to vary the effect of these elements during operation, and thus change the configuration of the output beam during operation. Thus, the effective f-number of the output beam will vary dynamically. For example, in a system where the polarization-selective element has a transmission axis parallel to the polarization direction of the source beam, the polarization-altering element can be temporarily disabled. In this condition, the output beam will include essentially all of the light in the square beam. The output beam will form a spot having a low effective f-number. The spot size will be relatively small at the nominal focus of the beam, but will increase rapidly with distance from the nominal focus. When the polarization-altering element is enabled, the beam returns to a high effective f-number.

A further aspect of the invention provides scanners incorporating illumination apparatus as discussed above. A scanner according to this aspect of the invention desirably includes a frame and an illumination apparatus as discussed above which is mounted to the frame so that the output beam from the illumination apparatus will be directed from the frame into a working region. The scanner desirably also includes a photo detector for receiving light returned from the working region and producing a signal representing the amplitude of the returned light. The scanner may include means such as a movable or variable optical element for moving the output beam relative to the frame.

Yet another aspect of the invention provides methods of forming an output light beam. The method according to this aspect of the invention desirably includes the steps of directing a source beam of polarized light in a downstream direction along an axis and nonuniformly altering the polarization direction of the source beam to provide an altered beam having first and second portions with different polarization directions and with different intensity distributions relative to the axis. Most preferably, the method includes the step of passing the altered beam through a polarization-selective element having a transmission axis so as to allow light having a polarization direction matching the transmission axis of such element to pass downstream into an output beam, while substantially excluding light with a polarization direction perpendicular to the transmission axis from the output beam. Methods according to this aspect of the invention can be used to form output beams having the characteristics discussed above in connection with the apparatus.

An additional aspect of the invention provides methods of scanning information-bearing elements as, for example, bar-coded objects. The method according to this aspect of the invention desirably includes the steps of providing a scanning beam focused to a spot at a focal location; moving the scanning beam relative to the information-bearing elements and detecting light reflected from the information-bearing elements to provide a signal representing the information carried by such elements. Most preferably, the method further includes the step of repeatedly varying the spot size and depth of field of the scanning beam during the moving and detecting steps so as to vary the beam characteristics between a first condition in which the beam has a small spot size at the focal location but a small depth of field and a second condition in which the beam has a larger spot size at said focal location but a larger depth of field. The varying step desirably is performed so that each individual information-bearing element will be scanned by the beam in both of said conditions. Some information-bearing elements will be read best by the beam in the first condition, whereas other information-bearing elements will be read by the beam in the second condition. As further discussed below, preferred methods in accordance with this aspect of the invention can provide scanning performance superior to that achievable with a scanning beam of fixed configuration. The step of varying the beam configuration can be performed using apparatus and methods according to the foregoing aspects of the invention.

BRIEF DESCRIPTION OF THE DRAWINGS OF PRESENT INVENTION

For a more complete understanding of how to practice the Objects of the Present Invention, the following Detailed Description of the Illustrative Embodiments can be read in conjunction with the accompanying Drawings, briefly described below.

DETAILED DESCRIPTION OF THE ILLUSTRATIVE EMBODIMENTS OF THE PRESENT INVENTION

Figure 1:
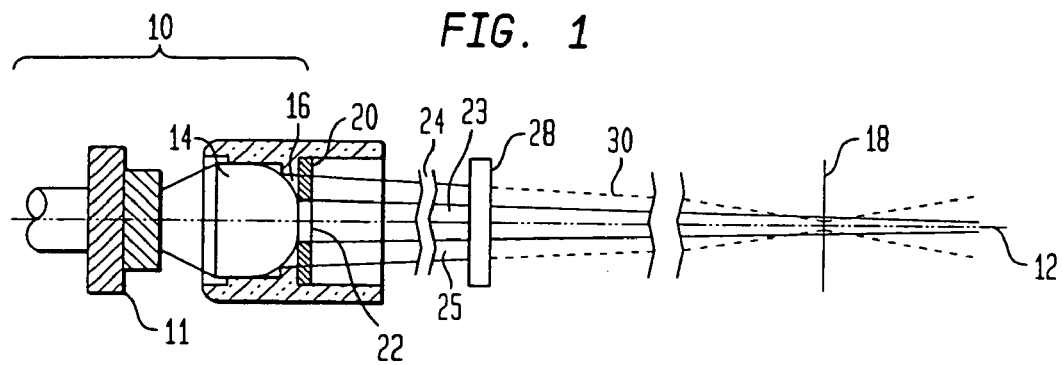
FIG. 1 is a diagrammatic view depicting illumination apparatus according to one embodiment of the invention.

Referring to the figures in the accompanying Drawings, the various illustrative embodiments of the instant invention will be described in great detail, wherein like elements will be indicated using like reference numerals.

Apparatus in accordance with one embodiment of the invention includes a light source 10 in the form of a visible laser diode or "VLD" 11 with a lens 14. The light source or VLD/lens assembly 10 produces a source beam of light. The light source projects this beam in a downstream direction (to the right as seen in FIG. 1) along an optical axis 12 and focuses the source beam to a spot at a focal location 18 along the optical axis. The light from VLD 10 is inherently plane polarized, so that the source beam 16 is plane polarized with a polarization direction transverse to the optical axis.

The term "polarization direction" as used in this disclosure with reference to a beam of light or with reference to a portion of a beam should be understood in its ordinary sense, as referring to the average direction of polarization of the light constituting the beam or portion of the beam. All light is constituted by individual waves or photons having individual electric and magnetic vectors transverse to the direction of propagation of the light. In unpolarized light, these vectors are oriented in random directions transverse to the direction of propagation, so that the vector sum of the electric vectors over any appreciable time is zero and the light as a whole has no definable polarization direction. In plane polarized light, also referred to as linearly polarized light, the electric vectors of an appreciable portion of the waves constituting the light are aligned with a polarization axis transverse to the direction of propagation of the light and hence transverse to the optical axis. The direction of this polarization axis, or another direction having a fixed relation to this direction, is commonly referred to as the direction of polarization of the light.

Downstream from the light source 10 is polarization-altering element 20 in the form of a wave retarder or birefringent element which has a central region 22 surrounding optical axis 12 removed from it so that there is a hole in the retarder. In the embodiment of FIG. 1, the polarization-altering element 20 is disposed close to the lens 14 of source 10. Merely by way of example, the birefringent element may include a polyvinyl alcohol film, laminated between a pair of cellulose acetate butyrate sheets. A first portion of the light in source beam 16 passes through the hole and hence its polarization is unaffected. A second portion of the light passes through the retarder 20 and hence its polarization is rotated away from the original polarization direction of the source beam. In effect, one portion of the light has its polarization rotated with respect to the remaining portion of light. This forms an altered beam 24 having a first portion 23 with one polarization direction and a second portion 25 with another polarization direction. The first portion 23, consisting of light passing through hole 22, has the original polarization direction of the source beam and has an intensity distribution concentrated close to optical axis 12. The second portion 25, consisting of light passing through retarder 20 outside of hole 22, has a different polarization direction and also has a different intensity distribution; this portion of the beam has an intensity distribution spread over a region remote from axis 12. Because the altered beam has two portions with different polarizations, the light can be manipulated further downstream. However, the altered beam contains all or essentially all of the light in the source beam.

The two portions of the altered beam can have light that is cross-polarized. This can be accomplished by using a wave retarder 20 known as a half wave plate, effective to rotate the polarization of the light forming the second portion 90 degrees. A half-wave plate is made from a birefringent material that has the proper thickness for the particular wavelength of light provided by source 10. In addition, to rotate linearly polarized light 90 degrees, the fast axis of the half-wave plate must be at 45 degrees to the polarization direction of the light. If the fast axis of the retarder is not at a 45 degree orientation to the polarization axis or does not have the required thickness, the two portions of the altered beam 24 will have light that is not fully cross-polarized. In other words, the two regions would share components in one direction. The amount that the polarization of the second portion 25 of the beam is rotated in retarder 20 affects how much of such shared component will be found in the altered beam.

A polarization-selective element in the form of a polarizing filter 28, also referred to as a polarizer, is disposed downstream from the polarization-altering element 20 along the optical axis. Polarizer 28 has a transmission axis transverse to optical axis 12. The polarizer is arranged to transmit light having a polarization direction parallel to the transmission axis but to block transmission of light having a polarization direction orthogonal to the transmission axis. The light from altered beam 24 passing through polarizer 28 forms an output beam 30. The output beam, like the source beam, is focused at nominal focal location 18.

Depending upon the relationship between the polarization directions of the beam portions in altered beam 24 and the transmission axis of polarizer 28, the polarizer will pass or block light in the first and second portions of the altered beam. Thus, if the transmission axis of polarizer 28 is aligned with the polarization direction of the first beam portion (from hole 22) and if the polarization direction of the second beam portion (from retarder 20) is perpendicular to the transmission axis, the output beam will consist essentially of light from the first portion. In this condition, the output beam 30 will have a high effective f-number; its characteristics will resemble those of a beam which would have been produced by a small aperture in an opaque plate. The output beam will have a good depth of field, but a relatively large spot size at the nominal focal location. The relationship of spot size versus distance along the optical axis for such a beam is indicated by curve 32 in FIG. 2.

If the transmission axis of the polarizer is aligned with the polarization direction of the second beam, the output beam 30 will have a substantially annular intensity distribution, and a low effective f-number.

Figure 3:
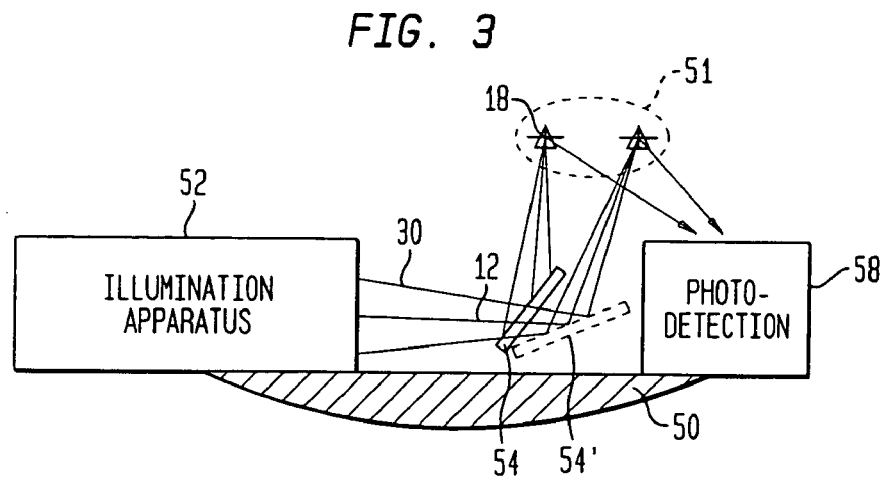
FIG. 3 is a diagrammatic view of a scanner according to a further embodiment of the invention.

A scanner according to a further embodiment of the invention includes a frame 50, illumination apparatus 52 incorporating the features discussed above with reference to FIG. 1 arranged to provide an output beam 30 in the manner discussed above. The scanner further includes a moving or time-varying optical element such as a moving mirror 54 disposed along the optical axis 12 and driven by a conventional actuator between the position illustrated in solid lines and the position shown in broken lines at 54' for moving the output beam and optical axis so as to sweep the focal location 18 in a pattern within a working region 51. Any other conventional moving or time-varying optical element, such as a moving prism or moving holographic element, can be employed for this purpose. Also, although the moving element is depicted as downstream from the entire illumination apparatus 52, the moving element may be disposed upstream from the polarizer. Alternatively, the entire illumination apparatus 52 can be moved to move the focal location. The scanner further includes a conventional photo detector 58 for detecting light reflected from the working region and providing a signal representing such light. In the particular embodiment of FIG. 3, photo detector 58 has a broad field of view which is fixed relative to the frame. In other scanners, commonly referred to as retro-reflective or "retro" scanners, the light reflected from the objects being scanned is directed by the same moving optical elements used to sweep the spot from the light source. The photo detector views the objects being scanned through the moving optical elements, and the field of view of the scanner moves with the spot from the illumination source. Either arrangement may be employed. In a further alternative, the information-bearing elements to be scanned can be moved relative to the frame. For example, a conveyor may move objects past a fixed frame, or else the frame may be in the form of a pen which can be moved manually. In the foregoing arrangements, the elements of the system which are used to move the information-bearing element relative to the beam or spot from the illumination system act as means for sweeping the output beam across the light and dark areas of the indicia.

A scanner according to these embodiments of the invention can be used in the conventional manner. A low f-number output beam is preferred for scanning high-resolution (small feature size) bar codes but requires that the bar coded object be positioned in a small range of locations relative to the scanner. A high f-number output beam is preferred for scanning low-resolution (large feature size) bar codes at varying distances from the scanner.

The elements depicted in FIG. 1 are drawn to near scale, except that the axial distance between the lens and focal location or nominal beam waist location 18 is shortened. In a typical system with the lens approximately 4.5 mm downstream from the VLD, the beam waist location may be 250 mm downstream from the lens.

Figure 4:
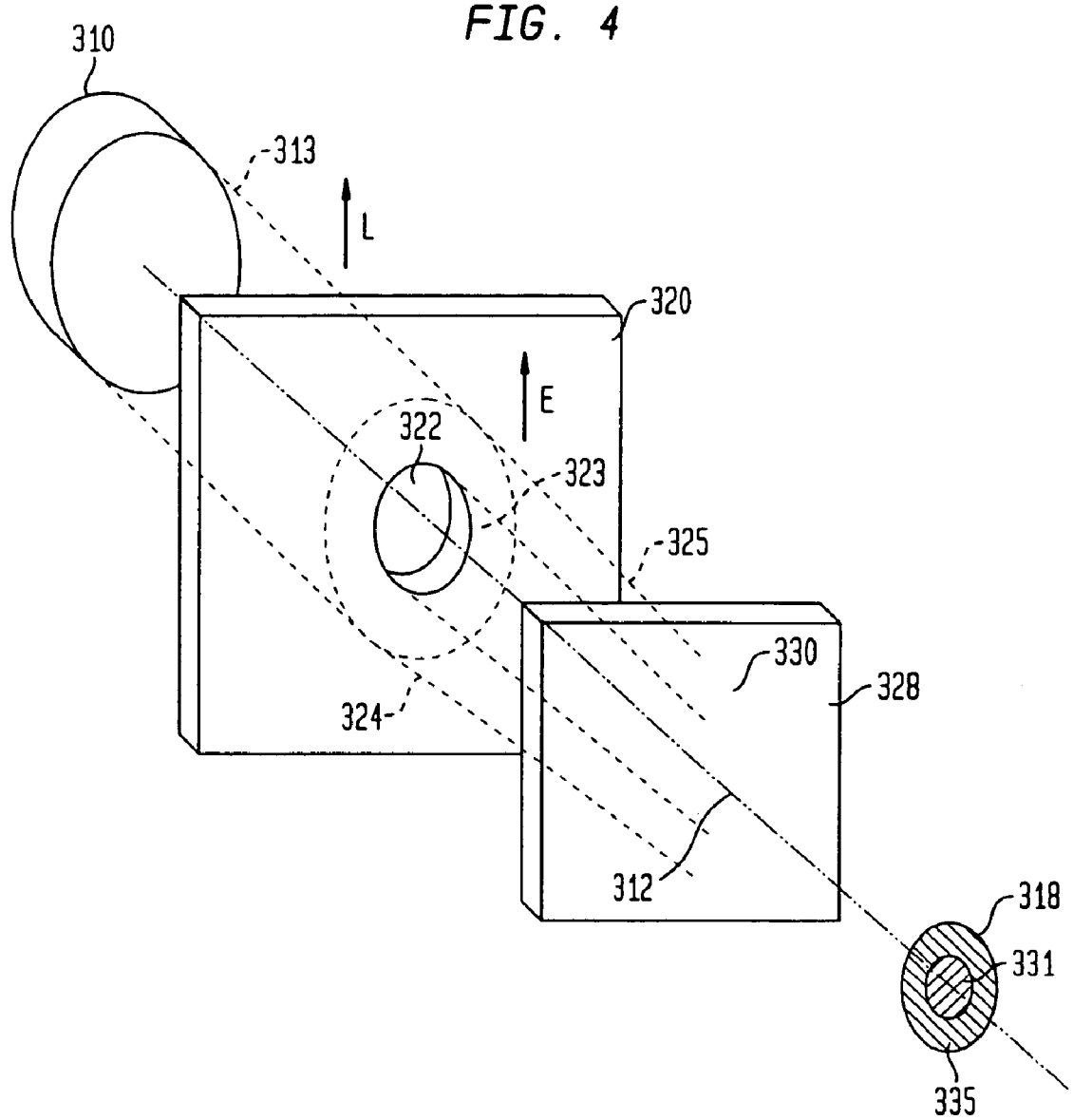
FIG. 4 is a diagrammatic perspective view depicting illumination apparatus according to a further embodiment of the invention.

The apparatus discussed above can be arranged to provide a non-circular spot. The apparatus depicted in FIG. 4 is generally similar to the apparatus discussed above in connection with FIG. 1. Here again, the light source 310 produces a source beam of light 313 which is plane-polarized and focused at a focal location 318 along the optical axis 312. However, in the apparatus of FIG. 4, the hole 322 in the retarder or birefringent element 320 is elongated in a direction of elongation E transverse to the optical axis 312. Accordingly, the first portion 323 of the altered light beam 324 passing through the hole 322 in the retarder has an elongated cross-sectional shape, with its long axis in the same direction E.

Here again, the light in the first portion 323 of the altered beam, immediately surrounding axis 312, has a first polarization direction whereas the light in the second portion of the beam has a second polarization direction different from the first polarization direction. However, in the embodiment of FIG. 4, the first portion of the beam has a non-circular cross-section corresponding to the noncircular cross-section of hole 322. If the transmission axis of the polarizer or filter 328 is parallel to the first polarization direction, the filter will block the light having the second polarization direction, so that the output beam 330 will consist essentially of the light in the first portion 323 of the altered beam. The beam will have a large effective f-number and will form a relatively large spot 335 at the nominal focal location with relatively good depth of field. This spot will have a non-circular shape corresponding to the non-circular shape of hole 322. Preferably, the smaller dimension of the spot is aligned with the direction of motion imparted by the movable optical elements of the scanning apparatus or other scanning arrangements.

If the transmission axis of the polarizer or filter 328 is parallel to the second polarization direction, the output beam will consist essentially of the light in the second portion 325 of the altered beam, and hence the beam will form a different spot 331 at the nominal focal location. If the polarization-altering element 320 is disabled, the entire altered beam will have the same polarization direction. If the transmission axis of the polarizer 328 is aligned with this polarization direction, essentially all of the light in the source beam will be included in the output beam. The size and shape of this spot are determined in part by the size and shape of the source beam 313 provided by the light source 310. For example, a light source incorporating a laser diode and lens may provide a noncircular source beam 313, which may yield a smaller spot 331, at the nominal focal location, having a noncircular outer border corresponding to the shape of the original beam and having a lower effective f-number.

Figure 5:
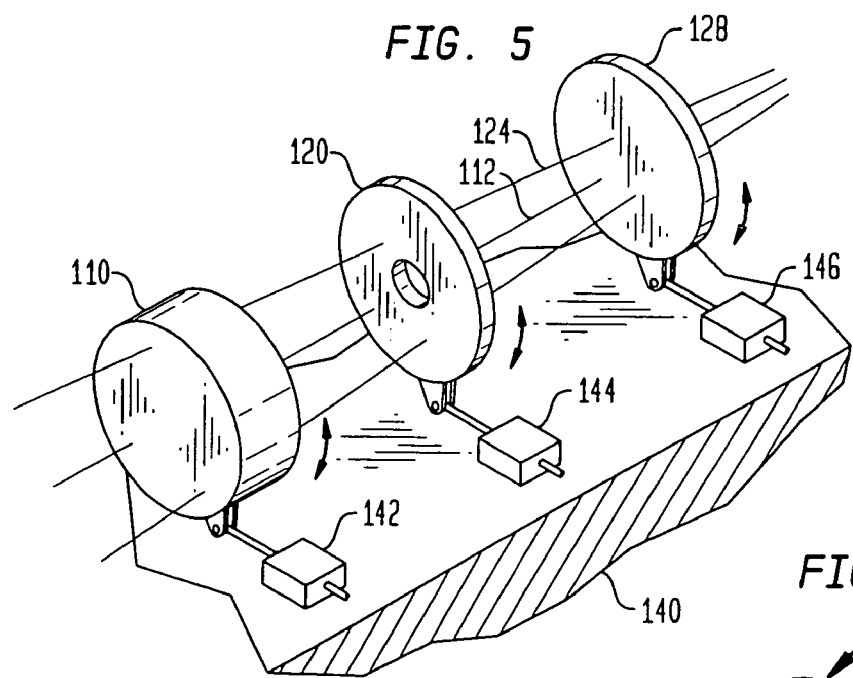
FIG. 5 is a diagrammatic perspective view depicting illumination apparatus according to yet another embodiment of the invention.

Illumination apparatus according to a further embodiment is schematically shown in FIG. 5. This apparatus incorporates a light source 110, polarization-altering retarder 120 and polarization-selective filter 128 similar to the corresponding elements of the embodiment discussed above with reference to FIG. 1. Each of these elements is movable relative to the frame 140 of the apparatus. Actuators 142, 144 and 146 are provided for moving these elements relative to optical axis 112 and frame 140. Actuators 142, 144 and 146 may be conventional mechanical or electromechanical actuators of any convenient type, as, for example, motion driven linkages, pneumatic cylinders, solenoids or the like. Operation of actuator 142 will vary the polarization direction of the source beam; operation of actuator 144 will change the orientation of retarder 120; whereas operation of actuator 146 will vary the orientation of the transmission axis of polarizer 128. Any one of these variations can be used to change the relationship between the polarization directions of the beam portions in altered beam 124 and the transmission axis of the polarizer. This will vary the shape of the output beam. In practice, of course, it is not necessary to move all of the elements, and only one actuator need be provided for moving any one of the source; the retarder or polarization-altering element; or the polarizing filter or polarization-selective element.

If the apparatus is arranged to turn the retarder or polarization-altering element 120, the angle between the polarization of the source beam and the fast direction of the retarder can be altered to enable and disable the polarization-altering element. When the fast axis of the retarder is aligned with the polarization direction of the source beam, the retarder does not alter polarization of the source beam and hence the retarder is effectively disabled. If the polarization direction of the source beam is aligned with the transmission axis of the polarizer, the output beam will include all of the light in the source beam when the polarization-altering element is disabled. In this condition, the output beam will resemble a beam formed by a larger-diameter aperture. The output beam will have a low effective f-number and a small spot size at nominal focal location 18, but relatively poor depth of field. The relationship of spot size versus distance along the optical axis for such a beam is indicated by curve 34 in FIG. 2. When the polarization-altering element is enabled and rotates the polarization direction 90 degrees, the output beam will include only the light in the first beam portion (passing through the hole in the retarder). In this condition, the output beam will have a high effective f-number and relatively large spot size at the nominal focal location, but will have good depth of field. The relationship between spot size and distance along the optical axis will be as indicated by curve 32 in FIG. 2. Apparatus with time-varying beam characteristics can be incorporated in a scanner as discussed above.

Figure 2:
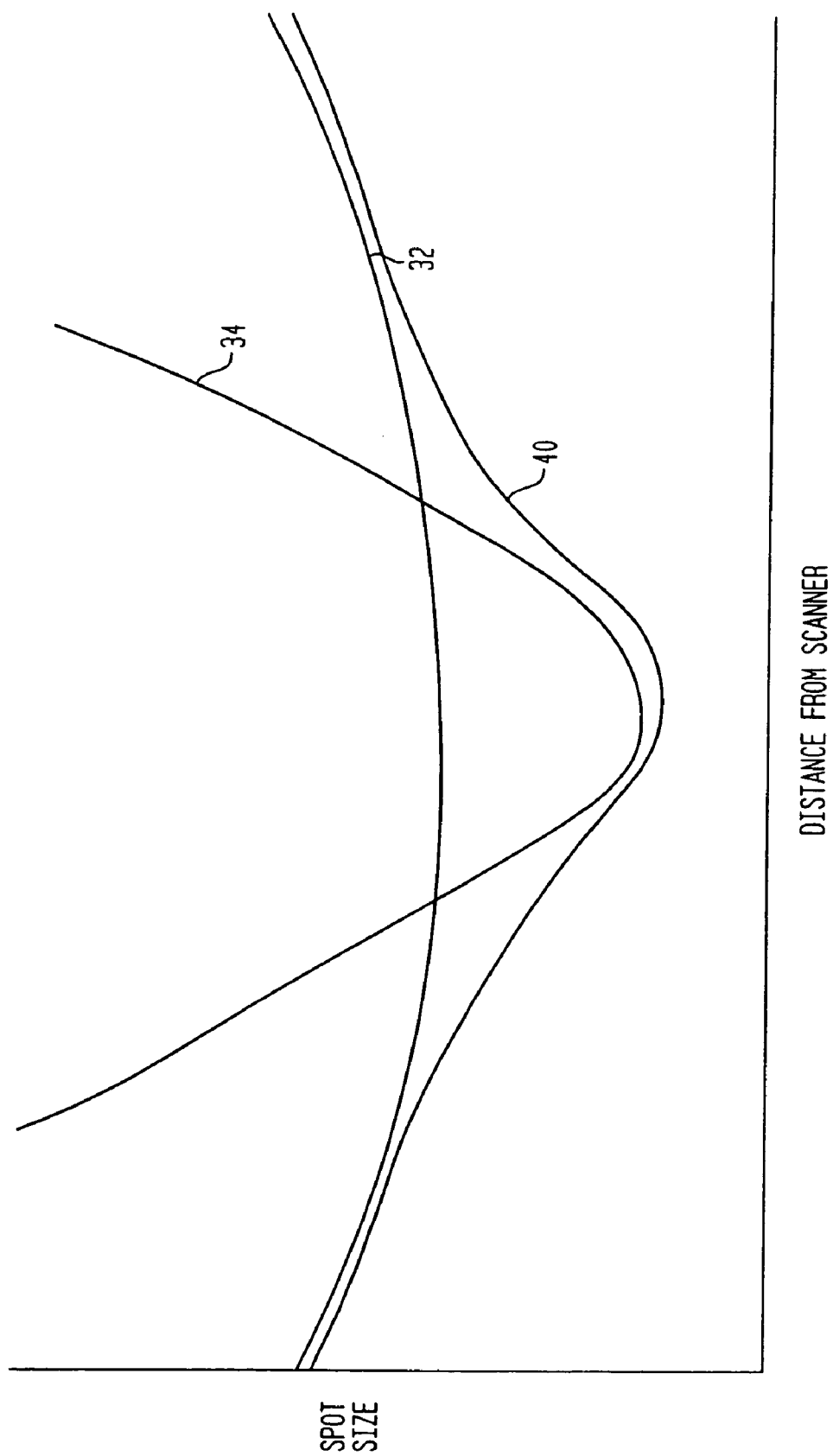
FIG. 2 is a graph depicting a relationship between spot size and position in the apparatus of FIG. 1.

In a particularly preferred method of operation, the actuator or actuators is driven to repeatedly change the characteristics of the output beam in the scanner between a large effective f-number (curve 32, FIG. 2) and a small effective f-number (curve 34, FIG. 2). For example, the actuator or actuators may be driven by a periodic driving signal so as to vary the beam characteristics periodically. Desirably, this variation occurs rapidly, so that as the scanner attempts to decipher a bar code on a given object, the bar code will be scanned by first by a beam having one f-number and then by a beam having another f-number. In a typical scanner which performs tens of scans per second, the f-number of the output beam may be varied at a rate of tens of Hz. Variation in the output beam f-number may be synchronized with the scanning motion of the beam, so that the beam sweeps through one or more complete scans at one f-number and then changes to another f-number and holds that f-number through one or more scans. If the object has a relatively low-resolution bar code, with large feature size, but is disposed at a substantial distance from the nominal focal location, the bar code will be successfully read by the beam having the high f-number (curve 32, FIG. 2). If the object has a small-feature bar code, but is properly positioned at the nominal focus, the bar code will be successfully read by the low f-number beam (curve 34). The system will provide performance matching that which would be achieved by using a light source having a curve of spot size versus distance indicated by composite curve 40 in FIG. 2, and will provide better overall performance than that which could be achieved using a fixed beam configuration.

In another variant, the frequency of the variation in f-number may be substantially higher than the scanning frequency and higher than the expected frequency of light-to-dark intensity transitions encountered as the beam sweeps across the information bearing object, so that the beam changes f-number repeatedly during each complete scan. The signal from the photo detector which receives the light from the scanned object can be sampled in synchronism with the change in f-number using conventional analog or digital sampling techniques, and the samples taken at different f-numbers can be separated into two separate series. Each series represents the results of a scan at one f-number, and can be processed in the same manner as samples from a conventional scan to decipher the bar code.

Figure 6:
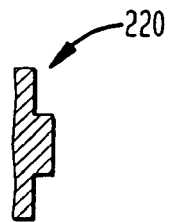
FIG. 6 is a fragmentary sectional view of a component used in apparatus according to yet another embodiment of the invention.

The retarder or birefringent element need not have a region physically removed from it. It is sufficient that it have two regions with different rotation properties. In the embodiments discussed above with reference to FIGS. 1–5, the hole in the retarder provides a region having zero rotation whereas the remainder of the retarder has a finite rotation. In other embodiments, different portions of the retarder may provide different non-zero rotations. For example, the retarder 220 of FIG. 6 has regions of different thickness to provide different degrees of rotation. Also, the retarder may be made from different materials in different regions, or subjected to different conditions which influence its degree of birefringence unequally.

Figure 7:
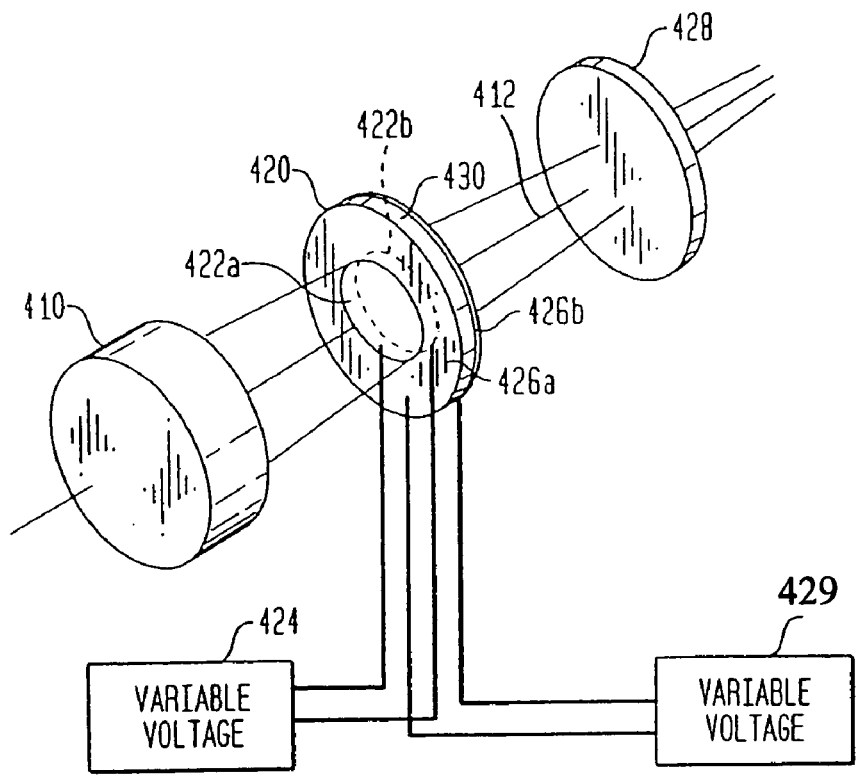
FIG. 7 is a diagrammatic perspective view depicting apparatus according to yet another embodiment of the invention.

The illumination apparatus of FIG. 7 includes a light source 410 and polarization-selective element 428 similar to those discussed above. The polarization-altering element 420 includes a transparent container 430 holding a material such as pneumatic liquid crystal having polarization-rotating properties dependent upon the magnitude of an electric field applied across the material. A first pair of transparent electrodes 422a and 422b cover opposite faces of the container in a central region adjacent the optical axis 412. These electrodes are connected to a first variable-voltage source 424. A second pair of transparent electrodes 426a and 426b cover a peripheral region of the container, remote from the optical axis. The second pair of electrodes is connected to a second variable voltage source 429. By varying the voltages applied to either or both pairs of electrodes, the polarization-altering properties of element 420 can be varied in the central region, in the peripheral region, or both.

Figure 8:
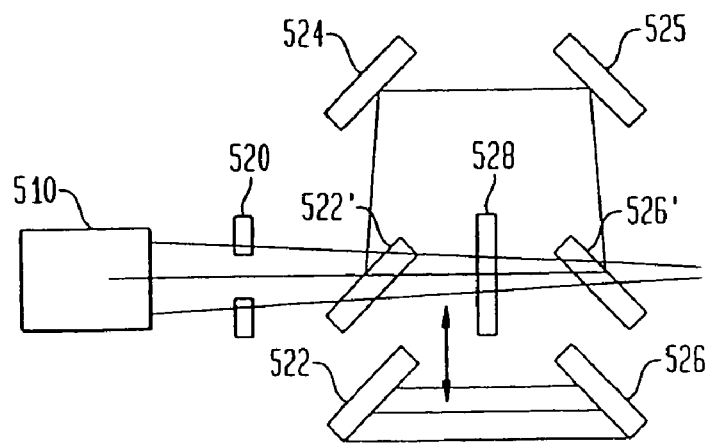
FIG. 8 is a diagrammatic view depicting apparatus according to a still further embodiment of the invention.

Apparatus according to a further embodiment of the invention (FIG. 8) includes a source 510, polarization-altering element 520 and polarization-selective element 528 similar to the corresponding elements discussed above with reference to FIG. 1. A movable optical element such as a mirror 522 can be selectively interposed along the path of the beam as indicated at 522' and 526' so as to selectively divert the beam around the polarization-selective element along an alternate path defined by mirrors 524, 525 and 526 and thereby disable the polarization-selective element 528.

In effect, the optical axis is moved relative to the polarization-selective element 528, while leaving the polarization-selective element in fixed position relative to the frame of the apparatus. A similar arrangement can be used to divert the beam around the polarization-altering element 520 so as to disable or enable that element. In another arrangement, the polarization-altering element can be selectively disabled by moving an auxiliary polarization-altering element into and out of the beam path. For example, where the polarization-altering element is arranged to rotate the polarization direction of one portion of the beam by 90 degrees, the auxiliary polarization-altering element can rotate the polarization direction of the same portion of the beam by 90 degrees. When the auxiliary polarization-altering element is operative, the total rotation is 180 degrees or 0 degrees.

Both the distribution and intensity of the light determines the shape of the beam downstream. The beam may include more than two portions with different polarizations. Provided that the various portions of the beam have a plane of symmetry coincident with the optical axis, the output beam will also have a plane of symmetry coincident with the optical axis. The invention also can be applied to production of other beam shapes. For example, if one portion of the altered beam has a first polarization has an intensity distribution predominantly on one side of the optical axis, and another portion of the altered beam has an intensity distribution on the other side of the optical axis, the output beam can be shifted relative to the optical axis by varying the action of the polarization selective element.

The embodiments discussed above take advantage of the inherent linear polarization of light from a VLD to manipulate the beam shape. While laser light typically is monochromatic and coherent, it does not necessarily have one particular polarization. VLD's typically produce linearly polarized light; certain gas lasers do not. Therefore, if an unpolarized He—Ne laser or other unpolarized light emitter is used in the light source, the light source should include a polarization-selective element downstream from the emitter but upstream from the polarization-altering element.

In the embodiments discussed above, a lens is used to focus the source beam. However, other optical elements such as mirrors and holographic optical elements can be used instead. Also, additional focusing elements such as lens, mirrors or holograms can be positioned anywhere along the optical axis. Further, the optical axis typically is not a straight line; elements such as mirrors and prisms can be employed to fold the optical axis. A moving mirror, prism or other moving element, such as element 54 (FIG. 3), can act both to fold the optical axis and to sweep the beam.

In the discussion above, the polarizer is referred to as either blocking or transmitting light. An ideal polarizer, operating on perfectly polarized light, would transmit all of the incident light having a polarization direction aligned with the transmission axis, and would transmit none of the light having a polarization direction perpendicular to the transmission axis. Real polarizers are not perfect. Thus, a real polarizer will transmit some small fraction of the light having a polarization direction perpendicular to the transmission axis and will attenuate light having a polarization direction parallel to the transmission axis. Also, the light in a given portion of the beam typically is not perfectly polarized, and its polarization direction may not be perfectly parallel or perfectly perpendicular to the transmission axis of the polarizer. For these reasons as well, unintended attenuation or transmission may occur. References in this disclosure to a polarizer blocking or transmitting light should be understood in this context as not requiring perfect blocking or transmission. However, the intended effect (blocking or transmitting light) should predominate. For example, where the polarizer is intended to block transmission of light in a particular portion of a beam, the amount of such light which is transmitted should be substantially smaller than the amount of such light which is blocked by the polarizer. Also, the polarization-selective element need not absorb the light which it blocks. For example, the polarization-selective element may be arranged to reflect or diffract the blocked light, so that it does not pass downstream into the output beam.

As used in this disclosure, the term "light" should be understood as including electromagnetic radiation in the infrared and ultraviolet regions of the spectrum, as well as visible light.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An illumination apparatus for forming an output beam, the apparatus comprising:
   (a) a light source adapted to emit a source beam of linearly-polarized light in a downstream direction along an optical axis, said source beam having a polarization direction transverse to said optical axis;
   (b) a fixed birefringent plate having first and second regions with different rotational properties such that said first region of said plate intercepts a first portion of said source beam and said second region intercepts a second portion of said source beam, said first and second regions altering the polarization of said first and second portions of said source beam by different amounts so as to form an altered beam having a central portion with a first polarization direction and a peripheral portion with a second polarization direction transverse to said first polarization direction, said peripheral portion substantially surrounding the entire outer periphery of the central portion, said central portion and said peripheral portion having a common axis comprising the optical axis, said central portion having a first intensity distribution relative to said optical axis, said peripheral portion having a second intensity distribution relative to said optical axis; and
   (c) at least one polarization-selective element mounted downstream from said birefringent plate, said at least one polarization-selective element having a transmission axis and being operative to allow transmission of light having a polarization direction parallel to said transmission axis and to prevent transmission of light having a polarization direction perpendicular to said transmission axis.

2. The illumination apparatus according to claim 1, wherein said first and second intensity distributions are different from one another.

3. The illumination apparatus according to claim 1, wherein said birefringent plate is arranged to provide said intensity distributions having a plane of symmetry.

4. An illumination apparatus for forming an output beam, the apparatus comprising:
   (a) a light source adapted to emit a source beam of linearly-polarized light in a downstream direction along an optical axis, said source beam having a polarization direction transverse to said optical axis;
   (b) a fixed birefringent plate having first and second regions with different rotational properties such that said first region of said plate intercepts a first portion of said source beam and said second region intercepts a second portion of said source beam, said first and second regions altering the polarization of said first and second portions of said source beam by different amounts so as to form an altered beam having a central portion with a first polarization direction and a peripheral portion with a second polarization direction transverse to said first polarization direction, said peripheral portion surrounding said central portion, said central portion having a first intensity distribution relative to said optical axis, said peripheral portion having a second intensity distribution relative to said optical axis; and
   (c) at least one polarization-selective element mounted downstream from said birefringent plate, said at least one polarization-selective element having a transmission axis and being operative to allow transmission of light having a polarization direction parallel to said transmission axis and to prevent transmission of light having a polarization direction perpendicular to said transmission axis,
   wherein said source includes an optical element focusing said source beam to a focal location, said birefringent plate being disposed between said optical element and said focal location, whereby said birefringent plate and said first and second regions determine the f-number of said output beam.

5. The illumination apparatus according to claim 1, wherein said birefringent plate provides approximately 90° difference between the polarization directions of said central and peripheral portions of said altered beam.

6. The illumination apparatus according to claim 1, wherein said source includes a laser diode.

7. The illumination apparatus according to claim 6, wherein said source further includes a lens downstream of said laser diode, said lens focusing light from said laser diode at a focal location on said optical axis.

8. The illumination apparatus according to claim 1, wherein said birefringent plate has a hole extending through it, said hole encompassing said optical axis, whereby said central portion of said altered beam will include light passing through said hole whereas said peripheral portion of said altered beam will include light passing through said birefringent plate.

9. An illumination apparatus for forming an output beam, the apparatus comprising:
   (a) a light source adapted to emit a source beam of linearly-polarized light in a downstream direction along an optical axis, said source beam having a polarization direction transverse to said optical axis;
   (b) a fixed birefringent plate having first and second regions with different rotational properties such that said first region of said plate intercepts a first portion of said source beam and said second region intercepts a second portion of said source beam, said first and second regions altering the polarization of said first and second portions of said source beam by different amounts so as to form an altered beam having a central portion with a first polarization direction and a peripheral portion with a second polarization direction transverse to said first polarization direction, said peripheral portion surrounding said central portion, said central portion having a first intensity distribution relative to said optical axis, said peripheral portion having a second intensity distribution relative to said optical axis; and (c) at least one polarization-selective element mounted downstream from said birefringent plate, said at least one polarization-selective element having a transmission axis and being operative to allow transmission of light having a polarization direction parallel to said transmission axis and to prevent transmission of light having a polarization direction perpendicular to said transmission axis, wherein said birefringent plate has a hole extending through it, said hole encompassing said optical axis, whereby said central portion of said altered beam will include light passing through said hole whereas said peripheral portion of said altered beam will include light passing through said birefringent plate, and wherein said hole is a non-circular opening that is elongated in a direction transverse to said optical axis.

10. An illumination apparatus for forming an output beam, the apparatus comprising:

(a) a light source adapted to emit a source beam of linearly-polarized light in a downstream direction along an optical axis, said source beam having a polarization direction transverse to said optical axis;

(b) a fixed birefringent plate having first and second regions with different rotational properties such that said first region of said plate intercepts a first portion of said source beam and said second region intercepts a second portion of said source beam, said first and second regions altering the polarization of said first and second portions of said source beam by different amounts so as to form an altered beam having a central portion with a first polarization direction and a peripheral portion with a second polarization direction transverse to said first polarization direction, said peripheral portion surrounding said central portion, said central portion having a first intensity distribution relative to said optical axis, said peripheral portion having a second intensity distribution relative to said optical axis; and (c) at least one polarization-selective element mounted downstream from said birefringent plate, said at least one polarization-selective element having a transmission axis and being operative to allow transmission of light having a polarization direction parallel to said transmission axis and to prevent transmission of light having a polarization direction perpendicular to said transmission axis, wherein said birefringent plate has a first thickness at said first region and has a second thickness at said second region, and said first and second intensity thickness are different from one another.

11. An illumination apparatus for forming an output beam, the apparatus comprising:

(a) a light source adapted to emit a source beam of linearly-polarized light in a downstream direction along an optical axis, the source beam having a polarization direction transverse to the optical axis;

(b) a birefringent plate having first and second regions with different rotational properties such that a first portion of the source beam passes through the first region of the plate and a second portion of the source beam passes through the second region of the plate, at least one of the first and second regions altering the polarization of at least one of the first and second portions of the source beam so as to form an altered beam having a central portion with a first polarization direction and a peripheral portion with a second polarization direction transverse to the first polarization direction, the peripheral portion substantially surrounding the entire outer periphery of the central portion, the central portion and the peripheral portion having a common axis comprising the optical axis, the central portion having a first intensity distribution relative to the optical axis, the peripheral portion having a second intensity distribution relative to the optical axis, the first and second intensity distributions being different and being selected to determine a downstream beam profile; and (c) at least one polarization-selective element mounted downstream from the birefringent plate, the at least one polarization-selective element having a transmission axis and being operative in a first configuration to substantially allow transmission of one of the central and peripheral portions and to substantially prevent transmission of the other of the central and peripheral portions.

12. The illumination apparatus according to claim 11, wherein the first and second intensity distributions create a composite beam profile.

13. The illumination apparatus according to claim 11, wherein the first and second intensity distributions create a first beam with a first waist and a second beam with a second waist, the second waist being more concentrated than the first waist.

* * * * *